US009962849B2

(12) United States Patent
Wangler et al.

(10) Patent No.: US 9,962,849 B2
(45) **Date of Patent: *May 8, 2018**

(54) WASHABLE STACKER APPARATUS WITH SELF-TENSIONING FEATURE FOR USE WITH A FOOD SLICING MACHINE

(71) Applicants: Eric J Wangler, Rochester, NY (US); David P Prior, Rochester, NY (US); Hermann Scharfen, Witten (DE)

(72) Inventors: Eric J Wangler, Rochester, NY (US); David P Prior, Rochester, NY (US); Hermann Scharfen, Witten (DE)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/712,454

(22) Filed: Sep. 22, 2017

(65) Prior Publication Data

US 2018/0071941 A1 Mar. 15, 2018

Related U.S. Application Data

(63) Continuation-in-part of application No. 15/146,383, filed on May 4, 2016, now Pat. No. 9,770,840.

(60) Provisional application No. 62/158,299, filed on May 7, 2015.

(51) Int. Cl.
*B65G 23/44* (2006.01)
*B26D 7/32* (2006.01)

(52) U.S. Cl.
CPC ............ *B26D 7/32* (2013.01); *B26D 2210/02* (2013.01)

(58) Field of Classification Search
CPC .............................. B26D 7/32; B26D 2210/02
USPC ............................ 198/810.04, 812, 813, 814
See application file for complete search history.

(56) References Cited

U.S. PATENT DOCUMENTS

| | | |
|---|---|---|
| 3,955,689 A | 5/1976 | Wallace |
| 3,956,518 A | 5/1976 | Goldbach |
| 4,015,494 A | 4/1977 | Spooner et al. |
| 4,309,927 A | 1/1982 | Dennis et al. |
| 4,321,847 A | 3/1982 | Dillon |
| 4,344,341 A | 8/1982 | Lotz |
| 4,428,263 A | 1/1984 | Lindee et al. |
| 4,532,751 A | 8/1985 | Mally et al. |
| 4,545,447 A | 10/1985 | Spooner et al. |
| 4,712,458 A | 12/1987 | Mally |
| 4,793,228 A | 12/1988 | Etter et al. |
| 4,881,928 A | 11/1989 | Bernal |
| 5,026,326 A | 6/1991 | Pollich |
| 5,101,702 A | 4/1992 | Kuchler |
| 5,724,874 A | 3/1998 | Lindee et al. |
| 5,934,449 A | 8/1999 | Dolan |
| 6,763,750 B2 | 7/2004 | Lindee |

(Continued)

*Primary Examiner* — Douglas A Hess
(74) *Attorney, Agent, or Firm* — John C. McMahon

(57) ABSTRACT

An improved food slice stacker is coupled to a meat slicer to automatically stack the slices from the slicer. The stacker includes a frame with a pair of spaced apart parallel supports that support a sprocket roller with axially spaced sets of sprocket teeth and a pulley roller with a plurality of axially spaced pulley members. The pulley members are aligned with the sets of sprocket teeth. A plurality of slice transport chains respectively engage the sets of sprocket teeth and the pulley members. The sprocket roller is motorized to enable the chains to transport food slices. The pulley roller is monolithically formed of a friction-free material to provide smooth surfaces that reduce retention of food particles thereon during washing.

16 Claims, 6 Drawing Sheets

(56) References Cited

U.S. PATENT DOCUMENTS

| | | | | |
|---|---|---|---|---|
| 6,843,365 | B2 | 1/2005 | Baker | |
| 7,832,316 | B2 | 11/2010 | Weber | |
| 8,113,339 | B2 | 2/2012 | Lenord | |
| 8,322,970 | B2 | 12/2012 | Ward | |
| 8,627,941 | B2 | 1/2014 | Lindee | |
| 8,683,903 | B2 | 4/2014 | Strong | |
| 8,770,378 | B2 | 7/2014 | Bauer | |
| 9,770,840 | B2 * | 9/2017 | Wangler | B26D 7/32 |

* cited by examiner

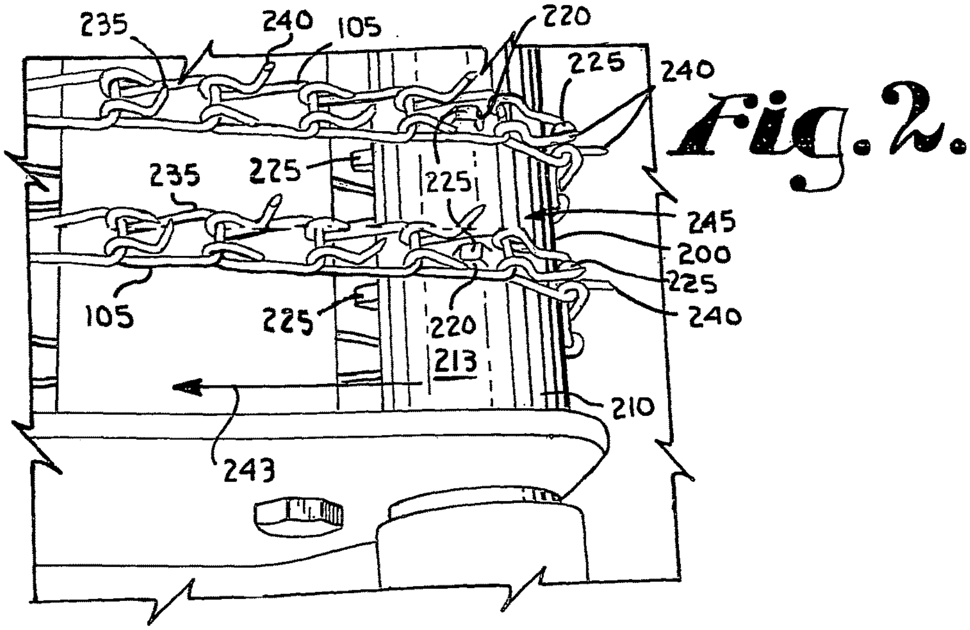
Fig. 2.
Fig. 3.
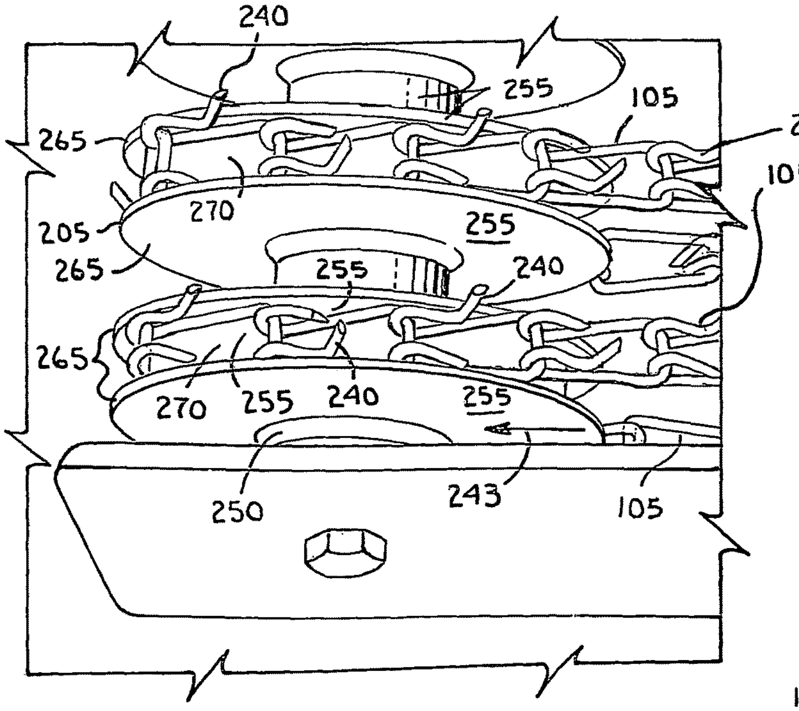
Fig. 9.
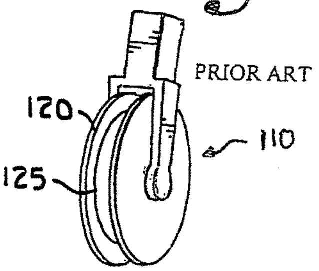
Fig. 10.
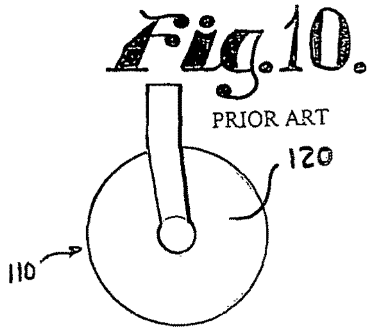

*Fig.* 13.
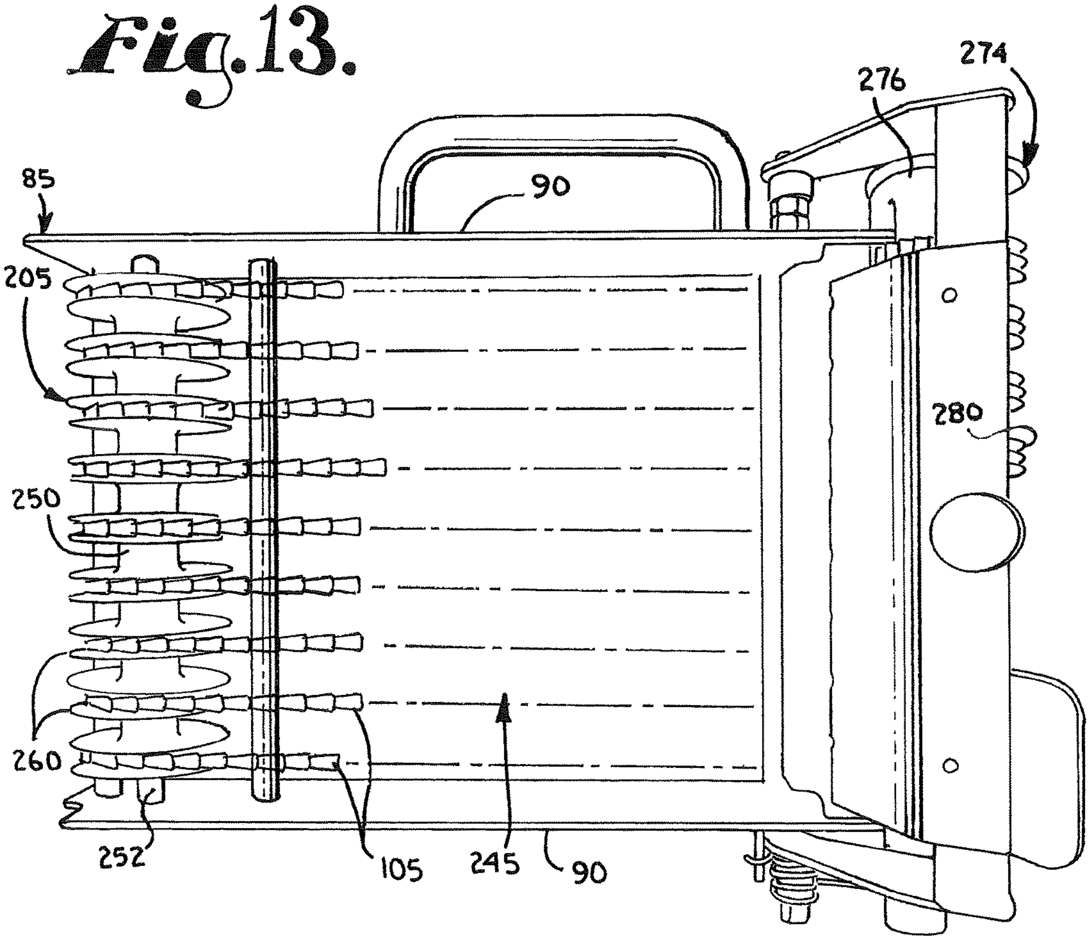
*Fig.* 14.
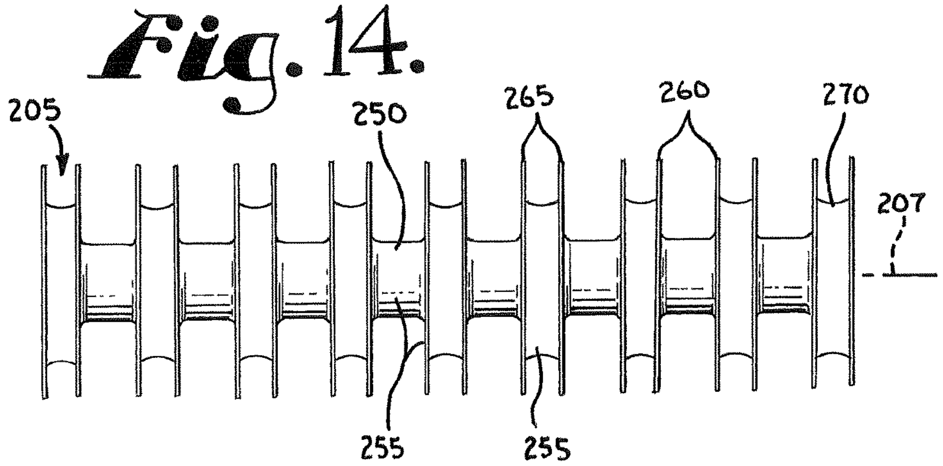

WASHABLE STACKER APPARATUS WITH SELF-TENSIONING FEATURE FOR USE WITH A FOOD SLICING MACHINE

CROSS-REFERENCE TO RELATED APPLICATIONS

This application is a Continuation-in-Part of U.S. patent application Ser. No. 15/146,383, published as U.S. Publication No. 20160325456 and which claims the benefit of U.S. Provisional Application No. 62/158,299 filed May 7, 2015, both of said applications being incorporated herein by reference.

BACKGROUND OF THE INVENTION

The present invention relates to improvements in a stacker apparatus for a food slicing machine, such as a meat slicer or meat slicing station.

Food slicing machines are well known in the art and can be found in meat processors, sandwich shops, delicatessens or “delis”, grocery stores, and the like. Such slicing machines are often used to slice cheese and meats into individual slices of a predetermined thicknesses. As is known in the art, such slicing machines generally include a motorized slicing blade that receives and cuts the food, an input structure for supporting and feeding the food into the blade, a thickness control mechanism for determining the thickness of the food slices, and a discharge mechanism for expelling the food slices from the slicer.

In high throughput settings, such as a meat processing setting, the food slicer may be functionally engaged with or coupled to a food slice stacking device, so that food slices expelled from the slicer are received by the stacker and then transferred to a stacking station, where the slices can be stacked into a food slice stack. Such coupled slicers and stackers are often automated and synchronized, so that the coupled slicer and stacker cooperate to cut and stack a pre-determined number of food slice stacks, wherein each stack includes a pre-determined number of food slices of a defined thickness.

Prior art stackers include a frame supporting several adjacent and vertically aligned downstream spring-loaded pulleys and an equal number of adjacent and vertically aligned upstream sprockets. Each spring-loaded pulley includes an individual pulley engaged with tensioning springs located within an adjacent stainless steel housing. Each of the spring-loaded pulleys is horizontally aligned with one of the sprockets, thereby providing several pulley-sprocket pairs. Each pulley-sprocket pair supports and engages an endless transport loop, such as a chain loop, that includes a plurality of food slice-receiving members, such as sharpened prongs, hooks or teeth. The sprockets are driven by a motor to rotate so that the engaged transport loops move across the front of the stacker, from an upstream end, which includes the sprockets, toward a downstream end, which includes the pulleys. Thus, a food slice pressed onto the front of the stacker is transported or conveyed in a downstream direction to a stacking station, where a transfer fork detaches the slice from the engaged slice-receiving members and then transfers it to a stacking surface, such as a platform, a scale, a conveyor belt, or the like.

To wash and sanitize the stacker, the spring-loaded pulleys and chains must be completely disassembled. After washing, the stacker parts must be reassembled. Disassembling and reassembling the stacker is time consuming and difficult, due to the large number of complex parts. Due to this time consumption and difficulty, users tend to avoid disassembling and reassembling the stacker, and instead wash the assembled stacker. Unfortunately, this practice leads to food particles remaining in the pulleys after cleaning. As is well known in the art, food particles remaining on such food handling equipment can lead to food-born illness. Consequently, practices often associated with prior art stackers may be unsuitable in sanitary food processing.

SUMMARY OF THE INVENTION

The present invention provides embodiments of an improved stacker apparatus for use with a food slicing machine, such as a meat slicer or slicing station. The present invention provides a simplified food slice stacker that can be easily washed and sanitized as an assembled unit, does not retain food particles and is therefore suitable for use in sanitary food handling and preparation.

An embodiment of a food slice stacking apparatus for use with a food slicing system according to the present invention includes: a support frame; a sprocket roller mounted on the support frame to enable rotation about a sprocket roller axis, the sprocket roller including a circumferential set of sprocket teeth; a pulley roller mounted on the support frame to enable rotation about a pulley roller axis in substantially parallel, spaced relation to the sprocket roller axis, the pulley roller having a pulley member thereon, the pulley member being aligned with the set of sprocket teeth, the pulley roller and the pulley member being monolithically formed as a one piece member; an endless transport loop engaged between the pulley member and set of sprocket teeth; and a drive mechanism engaged with the sprocket roller and controllable to selectively rotate the sprocket roller to cause the transport loop to transport a food slice from a food slicing system to a food slice stacking location.

The support frame may include a pair of support members positioned in spaced apart, parallel relation with the sprocket roller and the pulley roller rotatably supported between the support members in spaced apart, parallel relation. The support frame may include a pulley axle extends between the support members in spaced apart relation to the sprocket roller with the pulley roller is rotatably received on the pulley axle. The pulley roller is preferably formed of a non-stick, low friction material, such as polytetrafluoroethylene (PTFE).

The transport loop may be an endless transport chain formed of links having outward projections which releasably engage a food slice to transfer it from a food slicing system to a food slice stacking location. The apparatus may include a tension mechanism including a spring member and a guide plate. The guide plate slidably engages the transport loop and is urged to apply pressure thereto to cause a selected tension therein.

In an embodiment of the food slice stacking apparatus, the sprocket roller includes a plurality of axially spaced, circumferential sets of sprocket teeth. The pulley roller includes a plurality of axially spaced pulley members which are aligned respectively with the sets of sprocket teeth. A plurality of endless transport loops, each loop being engaged respectively with each pulley member and an aligned set of sprocket teeth. The pulley roller is monolithically formed as a one piece member. The sprocket roller may also be monolithically as a one piece member.

The apparatus may include a control member engaged with each tension mechanism and operable to simultaneously engage each guide plate with an associated transport loop in a first state of the control member and to simultaneously disengage the guide plates from the associated transport loops in a second state of the control member.

Embodiments of the stacker apparatus of the present invention are relatively simple in construction, such that cleaning and sanitizing are convenient to prevent the spread of food-born illnesses during uses of the stacker apparatus.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 2 is an enlarged perspective view of a portion of the upstream end of the stacker apparatus of FIG. 1 with portions broken away to show greater detail thereof and illustrating engagement of the transport chains with the sprocket members of the sprocket sleeve.

FIG. 3 is an enlarged perspective view of a portion of the downstream end of the stacker apparatus of FIG. 1 with portions broken away to show greater detail thereof and illustrating engagement of the transport chains with the pulley members of the pulley sleeve.

FIG. 9 is an enlarged perspective view of a pulley member of the stacking apparatus of FIG. 8.

FIG. 10 is side elevational view of the pulley member of FIG. 9.

FIG. 13 is a somewhat enlarged side elevational view similar to FIG. 8, showing an embodiment of a stacker apparatus according to the present invention.

FIG. 14 is a further enlarged side elevational view of a pulley roller according to the present invention.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
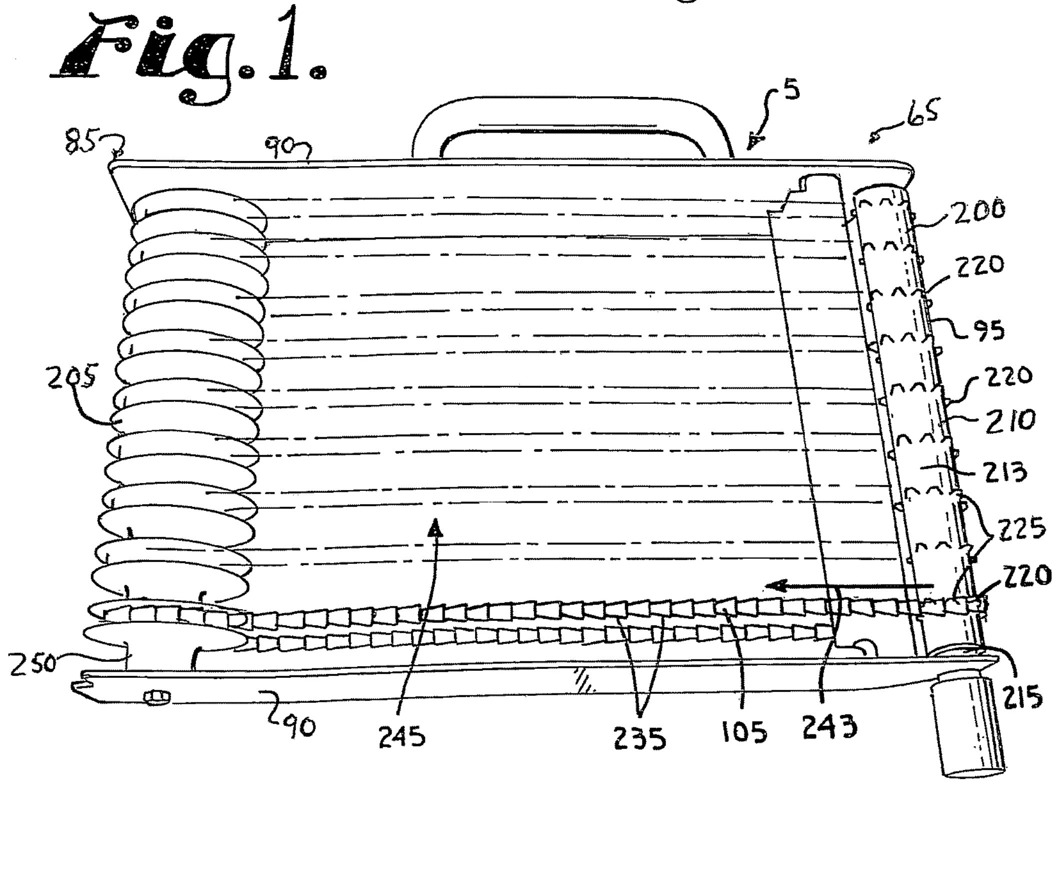
FIG. 1 is a perspective view of a first embodiment of a stacker apparatus according to the present invention.

Referring now to FIGS. 1-3, the reference numeral 5 generally represents an improved food slice stacking apparatus of the present invention, in a first embodiment. The stacking apparatus 5, also referred to herein as a stacker 5, is structured to be coupled with a food slicing device or slicer, generally 10, such as described in greater detail below and with regard to FIG. 7. The stacker 5 of the present invention is described in greater detail below.

Figure 7:
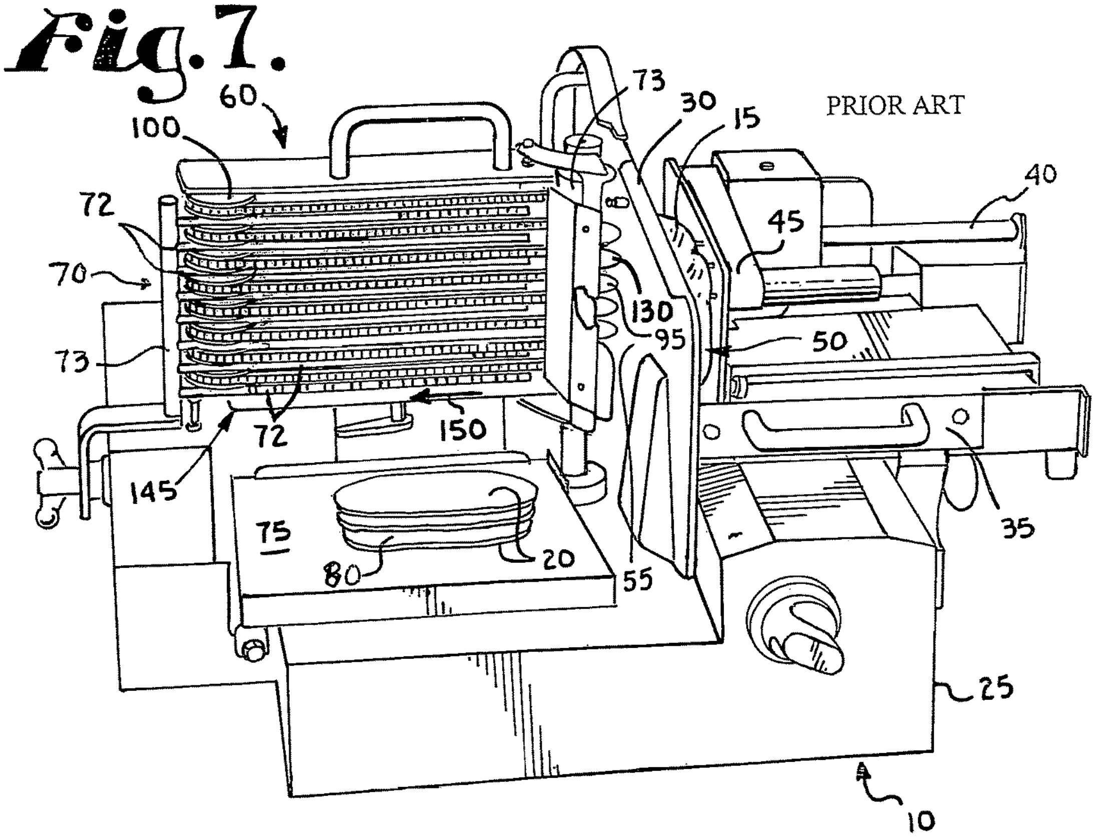
Fig. 7. PRIOR ART
FIG. 7 is a perspective view of a meat slicer coupled with a stacking apparatus.
Figure 8:
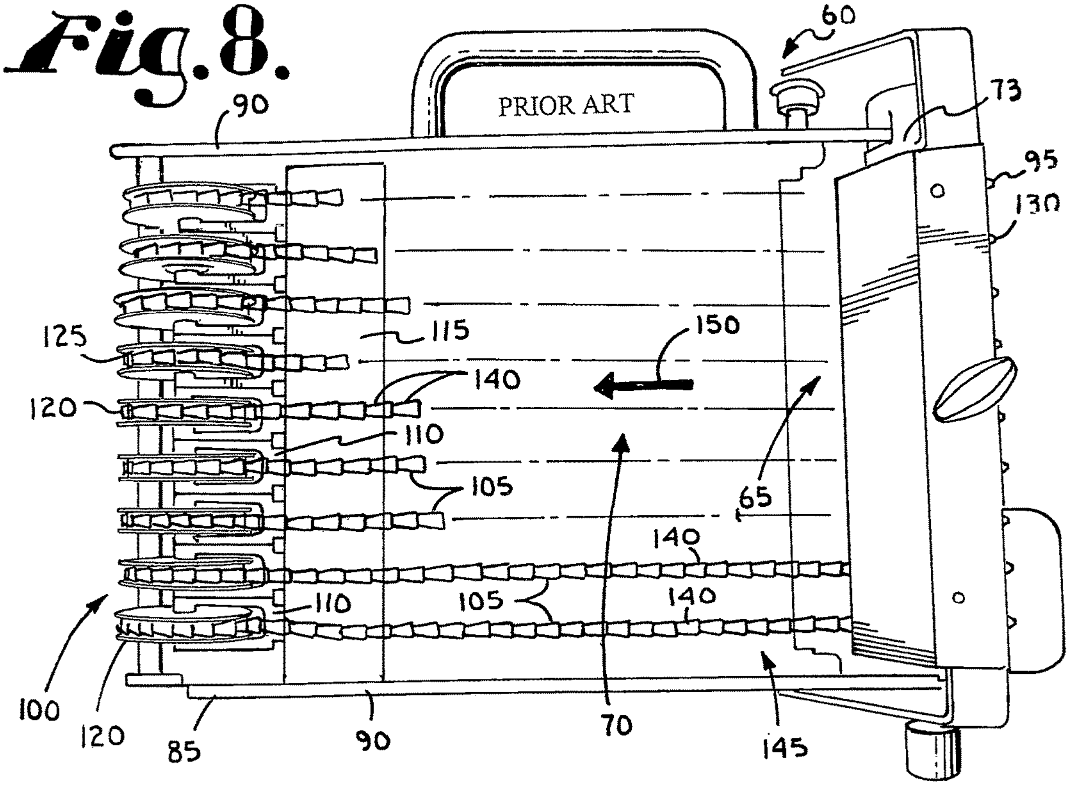
FIG. 8 is an enlarged fragmentary side elevational view of the stacking apparatus of FIG. 7.

Referring now to FIGS. 7-8, food slicers 10 are well known and are referred to by a variety of names, such as meat slicers, a food loaf slicers and cold-cut cutters. Such slicers 10 are used to cut a food loaf 15, such as meat or cheese, into a plurality of food slices 20. Exemplary food slicers 10 can be found in U.S. Pat. Nos. 3,956,518; 4,793,228; 5,101,702; and 5,724,874, each of which is incorporated herein by reference in its entirety.

Broadly speaking, a typical food slicer 10 includes a support frame 25, a slicing blade (not shown) in a blade housing 30 (FIG. 7) and a reciprocally movable food support 35. The food support 35 receives the food loaf 15, such as a block of cheese or a piece or loaf of meat to be cut into cold-cuts (i.e., slices 20). A pushing subassembly 40, such as a spring-loaded or weighted conveyor member 45, advances the food loaf 15 into an upstream side, generally 50, of the blade housing 30. As the food loaf 15 is engaged by the blade (not shown), the food support 35 is pushed and pulled, or otherwise moved back and forth or reciprocated across the blade (not shown), or crosswise with respect to the blade housing 30, so that the food loaf 15 is contacted by and sliced by the blade (not shown), so as to produce the slices 20. As each slice 20 is cut from the food loaf 15, it is expelled from the downstream side 55 of the blade housing 30 and the pushing member 40 advances the food loaf 15 toward the blade (not shown).

FIGS. 7-10 illustrate a stacker apparatus 60 for use with a slicer such as the slicer 10. During use, the stacker 60 is coupled to and synchronized with the slicer 10, so that slices 20 expelled from the slicer 10 are received at an upstream stacker receiving station, generally 65 (FIG. 8). At the receiving station 65, a roller subassembly (not shown) presses each slice 20 onto the stacker 60. The stacker 60 transports the received slices 20 to a downstream stacking station, generally 70. Then, tines 72 of a transfer fork 73 transfer the slices 20 from the stacking station 70 to a stacking surface 75 of the slicer support frame 25. As the transfer fork 73 moves the slices 20 from the stacking station 70 to the stacking surface 75, a stack 80 of slices 20 is formed. The stacker 60 is coupled with the slicer 10, in a well known manner, so as to be synchronized therewith. Similar stackers are described in U.S. Pat. Nos. 4,793,228 and 5,101,702, previously referenced.

As illustrated in FIGS. 8-10, the stacker apparatus 60 includes a frame 85 with spaced apart parallel upper and lower frame members 90, an upstream drive sprocket subassembly 95, a downstream idler pulley subassembly 100, and a plurality of spaced apart endless transport members or transport loops, such as transport chains 105. The sprocket subassembly 95 and the pulley subassembly 100 are spaced apart and parallel with each other, so as to be perpendicular to the upper and lower frame members 90, between which they are rotatably mounted. The sprocket and pulley subassemblies 95 and 100, respectively, engage and drive the tensioned transport members 105, by means of a sprocket motor (not shown) such as is described in greater detail below.

The illustrated pulley subassembly 100 includes a plurality of individual spring loaded pulley members 110 (FIGS. 9-10) engaged with a spring housing 115. Each of the pulley members 110 includes a pulley 120 and a pair of springs (not shown) that are housed within the spring housing 115. Each pulley 120 (FIG. 9) includes a groove 125 that slidingly receives and engages one of the transport members 105 so as to guide and tension the transport members 105. As mentioned above, a disadvantage of the pulley assembly 100 is that its numerous components (i.e., the pulleys 120, springs, and spring housing 115) must be disassembled to be sufficiently cleaned for use with food. Due to its complexity, the pulley assembly 100 includes numerous internal and external surfaces, and nooks and crannies, openings, bores, apertures, and other surface features that cannot be directly or easily accessed by a cleaning device, such as a dishwasher. Consequently, the stacker 60 may be prone to retaining food particles (not shown) thereon and may not be suitably sanitizable for food processing use.

The sprocket subassembly 95 of the stacker 60 includes a plurality of sprockets 130 with teeth (not shown) that engage and drive the transport members 105. In particular, the transport member 105 is an endless chain loop 105 with chain links 140 which the sprocket teeth (not shown) releasably engage as the sprocket assembly 95 rolls forward, such as is known in the art. Each sprocket 130 is horizontally aligned with one of the pulleys 120 and positioned so that the transport chains 105 are evenly spaced apart and parallel with one another. The sprockets 130 turn, roll or rotate such that the transport members 105 are moved or driven from the receiving station 65, which is associated with the sprocket subassembly 95, toward the stacking station 70, which is midway between the pulley subassembly 100 and the sprocket subassembly 95.

FIGS. 1-3 and 11-14 illustrate the improved stacker 5, in a first embodiment. The stacker 5 is similar to the stacker 60 in many ways. In particular, the improved stacker 5 can be coupled with a slicer apparatus 10 in the same manner as the stacker 60. Similar to the stacker 60, the improved stacker 5 includes a frame 85 with upper and lower frame members 90, a plurality of tensioned endless transport members 105, a receiving station 65, a stacking station similar to the stacking station 70 and a front side or front 245. When coupled with a slicer 10, the stacker 5 receives food slices 20 at the receiving station 65 and transports them downstream to the stacking station 70, where the slices 20 are removed and stacked by a transfer fork similar to the transfer fork 73 (FIG. 7), such as is known in the art.

The stacker apparatus 5 includes an upstream sprocket sleeve or roller assembly 200 and a downstream pulley sleeve or roller assembly 205, each of which is described in greater detail below. The sprocket roller 200 and the pulley roller 205 are each integrally or monolithically formed with a smooth non-stick low-friction surface, to eliminate the multiplicity of parts of the sprocket and pulley subassemblies 95 and 100. Due to this unitary construction, there are substantially fewer surfaces and surface features that can harbor food particles or bacteria, thereby rendering the stacker 5 safes and more suitable for sanitary food processing use. The sprocket roller 200 and the pulley roller 205 engage and propel or actuate the endless transport members or chains 105, such as described below with respect to FIGS. 2-3.

Figure 11:
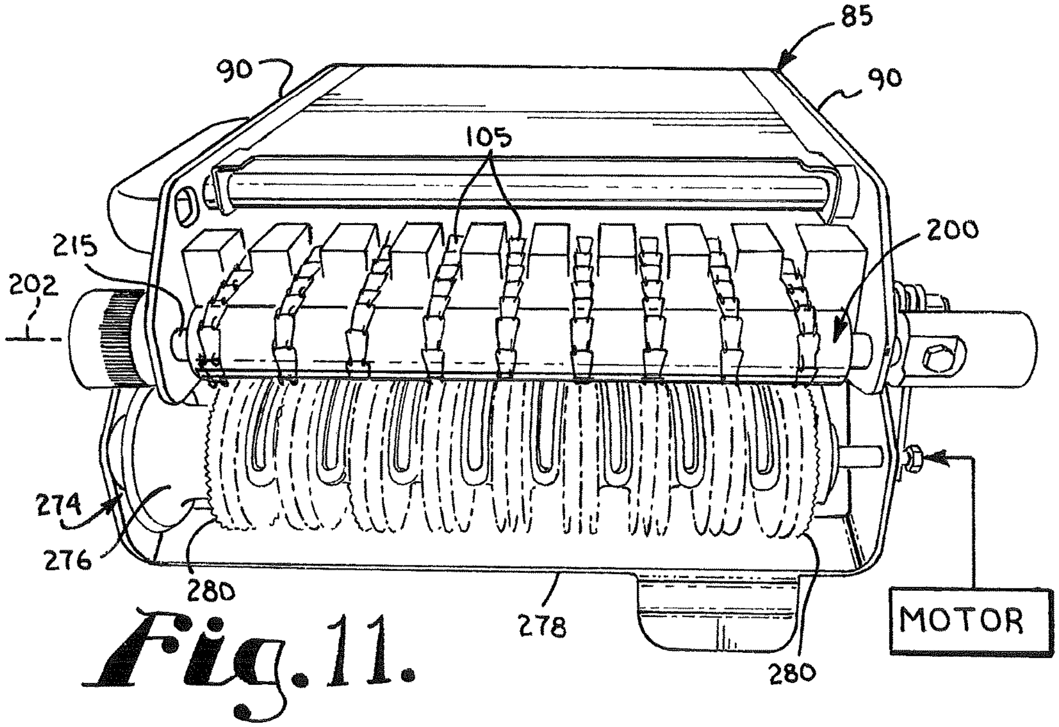
FIG. 11 is an enlarged side perspective view a drive mechanism for the stacker apparatus, oriented horizontally.

Referring now to FIG. 2, the sprocket roller 200 includes a tube-like cylindrical first roller member 210 that is slidingly received over a sprocket roller rod, shaft, spindle, or axle 215 (FIG. 1) about a sprocket roller axis 202 (FIG. 11). The sprocket roller axle 215 is connected or fixed to the frame members 90 so as to be perpendicular thereto. The illustrated sprocket roller member 210 may be formed, or molded, of a resilient polymer and has a smooth outer surface 213, so as to reduce the attachment or adhesion of food particles and substances thereto. As is known in the art, the sprocket roller member 210 can be formed of or coated with a non-stick material, such as Polytetrafluoroethylene (PTFE). A plurality of sprocket groups 220 are integrally formed on and radiate outwardly from the outer surface 213. The sprocket groups 220 are arranged in axially spaced relation along the length of the roller member 210 so as to be evenly spaced thereon. Each sprocket group 220 includes a plurality or set of radially extending sprocket teeth, detents or small projections 225 that are evenly spaced about the circumference of the roller member 210.

The transport members 105 of the stacker 5 are equal in number to the sprocket groups 220. In the illustrated embodiment, each transport member 105 is an endless chain 105 that includes a plurality of chain links 235 with outwardly extending prongs, projections, or hooks 240 (FIG. 3) which are provided to releasably engage a food slice 20. The prongs 240 are oriented to face outwardly across the stacker front side 245. Each chain 105 loops around the sprocket roller 200 so as to be engaged and driven by one of the sprocket groups 220. In particular, as the sprocket roller 200 rolls or rotates forwards (i.e. clockwise when viewed from above FIG. 13), the sprocket teeth 225 releasably engage the links 235 so that the chain 105 is driven in a downstream direction (see arrow 243 in FIG. 1) across the stacker front side 245.

Referring to FIGS. 2 and 3, the pulley roller assembly 205 includes a cylindrical pulley roller member 250 with a tube-like shape and a pulley roller axis 207 (FIG. 14). The pulley roller member 250 is received over a pulley roller rod, shaft, spindle, or axle 252 (FIG. 13) that is secured to the frame members 90 in perpendicular relation thereto. The illustrated pulley roller 205 is integrally or monolithically formed of a resilient, non-porous polymer that provides a substantially smooth, non-stick surface 255. In certain embodiments, the surface 255 may be a low-friction surface 255. In certain embodiments, the pulley roller 205 may be formed of, or painted or otherwise coated with a non-stick polymer material, such as polytetrafluoroethylene (PTFE), provided under the trademark Teflon (Chemours Company, www.chemours.com), or related polymers, as is known in the art.

Each pulley roller 205 includes a plurality of pulley members 260 axially spaced along the length of the pulley roller 205. The number of pulley members 260 is equal to the number of sprocket groups 220. Further, each of the pulley members 260 is paired and aligned with an opposite sprocket group 220 so as to provide sprocket-pulley pairs that are aligned with each other along an axis that is perpendicular to the sprocket and pulley rollers 200 and 205.

Each pulley member 260 includes a pair of parallel side members 265, such as radially extending circular flanges or plates, that are joined together so as to form a central grove portion 270 therebetween. A transport member 105 is received between the side members 265 in such a manner as to slidingly engage the groove portion 270. The smooth outer surfaces 255 of the pulley member 260, such as the outer surface 255 of the side members 265 and the groove portion 270, enable the transport member 105 to slide freely through the pulley member 260. In some embodiments, the pulley roller 205 may be stationary and the transport members may 105 slide through the respectively associated pulley member 260, in response to actuation, or rolling, of the sprocket roller 200, which drives the transport member 105. In other embodiments, the pulley roller 205 may be freely rotatable on the associated pulley roller axle 252, such that movement of the transport members 105 through the pulley members 260 rotates or rolls the pulley roller 205 assembly about the pulley roller axle 252.

Figure 12:
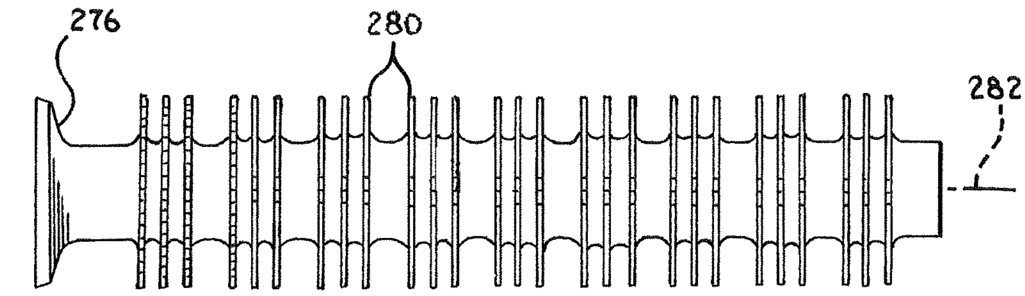
FIG. 12 is a further enlarged side elevational view of a sprocket drive roller of the stacker apparatus drive mechanism.

Referring to FIGS. 11 and 12, an embodiment of a sprocket drive mechanism 274 for the stacker apparatus 5 is illustrated. The drive mechanism 274 includes a sprocket drive roller 276 rotatably mounted on a drive frame 278 connected to the stacker frame 85. The sprocket drive roller 276 has circumferential sets of radially outwardly directed drive teeth 280 axially spaced therealong. The sets of teeth 280 are axially positioned to align with the groups 220 (FIG. 1) of sprocket teeth 225 on the sprocket roller member 210. The drive teeth 280 engage the sprocket teeth 225, and may also engage the transport chains 105, such that rotation of the sprocket drive roller 276 about a drive roller axis 282 causes the sprocket roller member 210 to rotate, thereby propelling the chains 105 to move in the downstream direction indicated by the arrow 243 (FIG. 1). A sprocket drive motor 284 is engaged with the drive roller 276 and is activated in coordination with the slicer apparatus 10 to selectively propel the slice transport chains 105.

Figure 5:
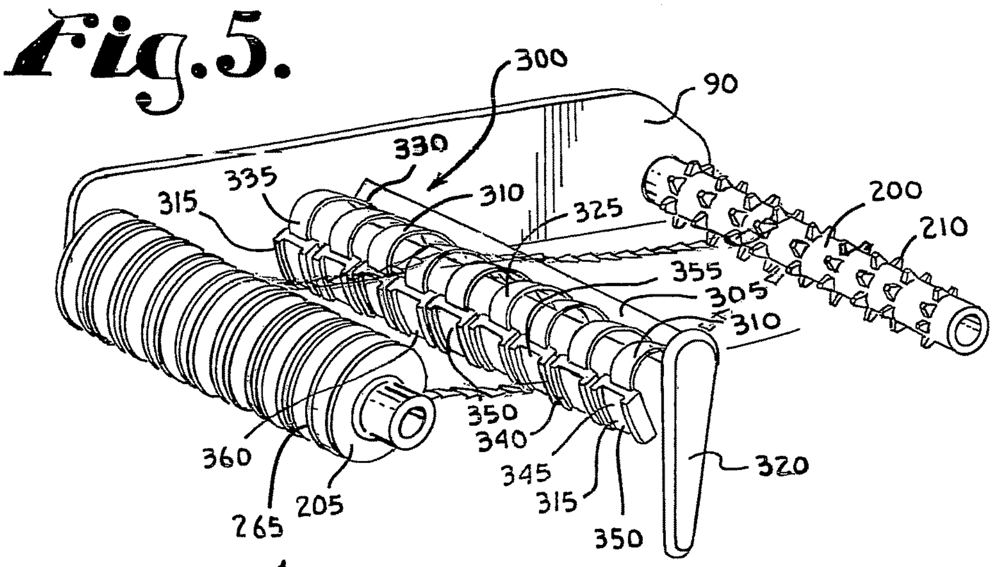
FIG. 5 is a perspective view of the stacker apparatus of FIG. 4, with portions broken away and shown in phantom to show greater detail thereof and illustrating a tension mechanism of the second embodiment with the tension mechanism in a disengaged condition.
Figure 4:
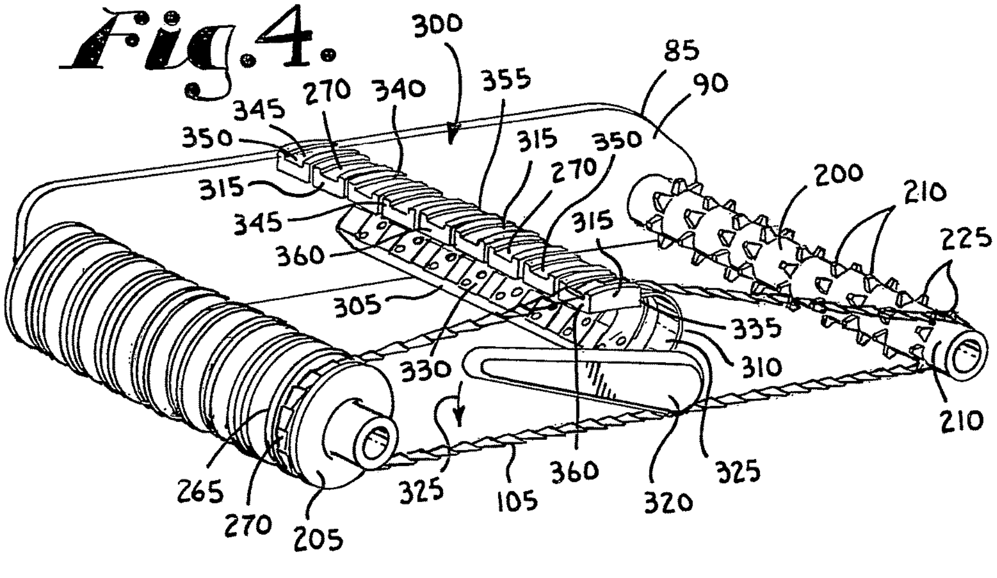
FIG. 4 is a perspective view at a reduced scale of a second embodiment of the stacker apparatus of FIG. 1 with portions broken away and shown in phantom to show greater detail thereof and illustrating a tension mechanism of the second embodiment with the tension mechanism in an engaged condition.

Referring to FIGS. 4-5, in a second embodiment, the stacker apparatus 5 includes a releasable tension mechanism 300 that engages and outwardly biases the transport members 105 to induce a desired tension therein. The tension mechanism 300 includes a support bar 305 to which are attached a plurality of spring members 310 which are aligned respectively with the transport members 105. Each of the spring members 310 is connected to a guide plate 315. The support bar 305 is pivotally connected to the frame members 90 so that the support bar 305 can be reversibly pivoted about a longitudinal axis thereof. The support bar 305 can be pivoted from a first or engaged position (FIG. 4) to a second or disengaged position (FIG. 5) by pivoting or otherwise actuating a control handle or lever 320 extending from the bar 305, such as indicated by the arrow 325. As described below, when the support bar 305 is in the engaged position (FIG. 4), the guide plates 315 engage and outwardly bias the associated transport members 105. When the support bar 305 is in the disengaged position (FIG. 5), the guide plates 315 are disengaged from and do not outwardly bias the associated transport members 105.

In the illustrated embodiment, the spring members 310 are leaf springs 325; however, it is foreseen that other spring mechanisms, such a torsional springs, can be substituted for the leaf springs 325. In the illustrated embodiment, each leaf spring 325 is attached to the support bar 305 at a first end 330 thereof. The second end 335 of each leaf spring 325 is attached to a bottom side (not shown) of a guide plate 315. Each guide plate 315 includes a top side 340 with a partially cylindrical slot or channel 345 with a generally rectangular cross-section and smooth low-friction engagement surface 350. The guide plates 315 are formed of a resilient, pore-less polymer with non-stick surfaces that do not retain food particles or harbor bacteria. In some embodiments, the guide plate 315 may be coated or painted with a non-stick material, such as polytetrafluoroethylene or the like, such as is known in the art Each slot 345 is sized and shaped to slidingly receive a transport member 105 therethrough. Accordingly, the transport members 105 slide into the upstream ends 355 of respective slots 345, along the engagement surface 350, and then out of the downstream ends 360 of the slots 345. When engaged (FIG. 4), the leaf spring 325 pushes the guide plate engagement surface 350 outwardly, to outwardly bias the transport member 105. When disengaged (FIG. 5), the guide plates 315 are turned or pivoted inwardly and away from the transport members 105, so that the transport members 105 are no longer outwardly biased. Since the engagement surfaces 350 no longer press against the transport member s105, the transport members 105 are loosened. Loosening the transport member 105, by disengaging the tension mechanism 300 makes it easier to clean between the transport members 105 and the sprocket and pulley rollers 200 and 205, respectively. Further, when the tension on a transport member 105 is reduced, it is easier to replace the transport member 105.

Figure 6:
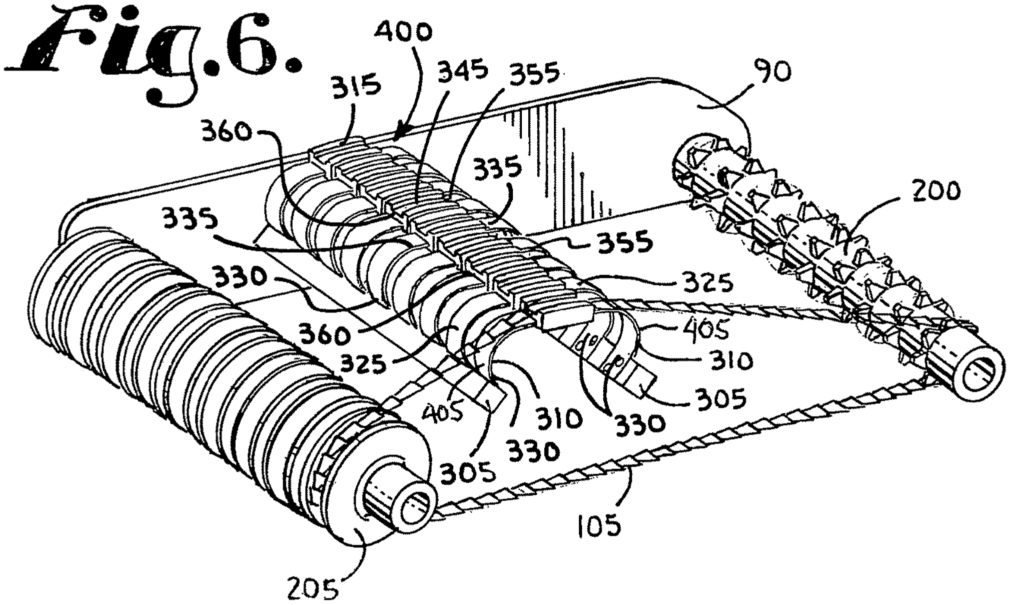
FIG. 6 is a perspective view of a third embodiment the stacker apparatus of FIG. 1 with portions broken away and shown in phantom to show greater detail thereof and illustrating a tension mechanism of the third embodiment.

Referring to FIG. 6, in a third embodiment, the stacker apparatus 5 includes a non-releasable tension mechanism 400. The tension mechanism 400 is substantially similar to the releasable tension mechanism 300, except that tension mechanism 400 lacks a handle and is, thus, not disengageable. In particular, the tension mechanism 400 includes a pair of support bars 305, a plurality of spring member pairs 405, and a plurality of guide plates 315, sets of which are aligned respectively with the transport members 105. The support bars 305 are spaced apart and fixed to the frame members 90 so as to be non-pivotable. Each spring member pair 405 includes two opposed spring members 310, such as a pair of opposed leaf springs 325. As shown in FIG. 6, the spring members 310 are oriented so that a first of the spring members 310 is attached to a first of the support bars 305 and the second of the spring members 310 is attached to the second of the support bars 305, at first ends 330 of the spring members 310. Second ends 335 of the spring members 310 are both attached to a guide plate 315, so that the guide plate 315 is held between and away from the spring member second ends 335. The guide plates 315 of the tension mechanism 400 are substantially similar to the guide plates 315 of the tension mechanism 300 (FIGS. 4-5). Accordingly, the guide plates 315 of the tension mechanism 400 outwardly bias the associated transport members 105.

It is to be understood that while certain forms of the present invention have been illustrated and described herein, it is not to be limited to the specific forms or arrangement of parts described and shown.

What is claimed and desired to be secured by Letters Patent is:

1. A food slice stacking apparatus for use with a food slicing system and comprising:

(a) a support frame;

(b) a sprocket roller mounted on the support frame to enable rotation about a sprocket roller axis, the sprocket roller including a circumferential set of sprocket teeth;

(c) a pulley roller mounted on the support frame to enable rotation about a pulley roller axis in substantially parallel, spaced relation to the sprocket roller axis, the pulley roller having a pulley member thereon, the pulley member being aligned with the set of sprocket teeth, the pulley roller and the pulley member being monolithically formed as a one piece member;

(d) an endless transport loop engaged between the pulley member and set of sprocket teeth; and (e) a drive mechanism engaged with the sprocket roller and controllable to selectively rotate the sprocket roller to cause the transport loop to transport a food slice from a food slicing system to a food slice stacking location.

2. A food slice stacking apparatus for use with a food slicing system and comprising:

(a) a support frame including a pair of support members positioned in spaced apart, parallel relation;

(b) a sprocket roller mounted on the support frame to enable rotation about a sprocket roller axis, the sprocket roller including a plurality of axially spaced, circumferential sets of sprocket teeth;

(c) a pulley axle extending between the support members in spaced apart, parallel relation to the sprocket roller;

(d) a pulley roller rotatably received on the pulley axle, the pulley roller having a plurality of axially spaced pulley members thereon, the pulley members being aligned with respective sets of sprocket teeth, the pulley roller and the pulley members being monolithically formed as a one piece member;

(d) a plurality of endless transport loops, each loop being engaged respectively with a pulley member and an aligned set of sprocket teeth;

(e) a drive mechanism engaged with the sprocket roller and controllable to selectively rotate the sprocket roller to cause the transport loops to transport a food slice from a food slicing system to a food slice stacking location;

(f) a tension mechanism associated with each transport loop and including a spring member and a guide plate; and (g) each guide plate slidably engages the associated transport loop and is urged to apply pressure thereto to cause a selected tension therein.

3. An apparatus as set forth in claim 2 wherein:

(a) the pulley roller is formed of a non-stick, low friction material.

4. An apparatus as set forth in claim 2 wherein:

(a) the pulley roller is formed of polytetrafluoroethylene (PTFE).

5. An apparatus as set forth in claim 2 wherein:

(a) each transport loop is an endless transport chain formed of links having outward projections which releasably engage a food slice to transfer it from a food slicing system to a food slice stacking location.

6. An apparatus as set forth in claim 2 and including:

(a) a control member engaged with each tension mechanism and operable to simultaneously engage each guide plate with an associated transport loop in a first state of the control member and to simultaneously disengage each guide plate from the associated transport loop in a second state of the control member.

7. A food slice stacking apparatus for use with a food slicing system and comprising:

(a) a support frame including a pair of support members positioned in spaced apart, parallel relation;

(b) a sprocket roller mounted on the support frame to enable rotation about a sprocket roller axis, the sprocket roller including a plurality of axially spaced, circumferential sets of sprocket teeth;

(c) a pulley axle extending between the support members in spaced apart, parallel relation to the sprocket roller;

(d) a pulley roller rotatably received on the pulley axle, the pulley roller having a plurality of axially spaced pulley members thereon, the pulley members being aligned with respective sets of sprocket teeth, the pulley roller and the pulley members being monolithically formed of a non-stick, low friction material as a one piece member;

(d) a plurality of endless transport loops, each loop being engaged respectively with a pulley member and an aligned set of sprocket teeth;

(e) a drive mechanism engaged with the sprocket roller and controllable to selectively rotate the sprocket roller to cause the transport loops to transport a food slice from a food slicing system to a food slice stacking location;

(f) a tension mechanism associated with each transport loop and including a spring member and a guide plate;

(g) each guide plate controllable to slidably engage the associated transport loop and is urged to apply pressure thereto to cause a selected tension therein; and (h) a control member engaged with each tension mechanism and operable to simultaneously engage each guide plate with an associated transport loop in a first state of the control member and to simultaneously disengage each guide plate from the associated transport loop in a second state of the control member.

8. An apparatus as set forth in claim 7 wherein:

(a) the pulley roller is formed of polytetrafluoroethylene (PTFE).

9. An apparatus as set forth in claim 7 wherein:

(a) each transport loop is an endless transport chain formed of links having outward projections which releasably engage a food slice to transfer it from a food slicing system to a food slice stacking location.

10. A food slice stacking apparatus for use with a food slicing system and comprising:

(a) a support frame;

(b) a sprocket roller mounted on the support frame to enable rotation about a sprocket roller axis, the sprocket roller including a circumferential set of sprocket teeth;

(c) a pulley roller mounted on the support frame to enable rotation about a pulley roller axis in substantially parallel, spaced relation to the sprocket roller axis, the pulley roller having a pulley member thereon, the pulley member being aligned with the set of sprocket teeth, the pulley roller and the pulley member being monolithically formed as a one piece member;

(d) an endless transport loop engaged between the pulley member and set of sprocket teeth;

(e) a drive mechanism engaged with the sprocket roller and controllable to selectively rotate the sprocket roller to cause the transport loop to transport a food slice from a food slicing system to a food slice stacking location;

(f) a tension mechanism including a spring member and a guide plate; and (g) the guide plate slidably engages the transport loop and is urged to apply pressure thereto to cause a selected tension therein.

11. An apparatus as set forth in claim 10 wherein:

(a) the support frame includes a pair of support members positioned in spaced apart, parallel relation; and (b) the sprocket roller and the pulley roller are rotatably supported between the support members in spaced apart, parallel relation.

12. An apparatus as set forth in claim 10 wherein:

(a) the support frame includes a pair of support members positioned in spaced apart, parallel relation;

(b) the sprocket roller is rotatably supported between the support members;

(c) a pulley axle extends between the support members in spaced apart relation to the sprocket roller; and (d) the pulley roller is rotatably received on the pulley axle.

13. An apparatus as set forth in claim 10 wherein:

(a) the pulley roller is formed of a non-stick, low friction material.

14. An apparatus as set forth in claim 10 wherein:

(a) the pulley roller is formed of polytetrafluoroethylene (PTFE).

15. An apparatus as set forth in claim 10 wherein:

(a) the transport loop is an endless transport chain formed of links having outward projections which releasably engage a food slice to transfer it from a food slicing system to a food slice stacking location.

16. An apparatus as set forth in claim 10 wherein:

(a) the sprocket roller includes a plurality of axially spaced, circumferential sets of sprocket teeth;

(b) the pulley roller includes a plurality of axially spaced pulley members which are aligned respectively with the sets of sprocket teeth; and (c) a plurality of endless transport loops, each loop being engaged respectively with a pulley member and an aligned set of sprocket teeth.

* * * * *